United States Patent [19]

Johnson et al.

[11] 4,281,843
[45] Aug. 4, 1981

[54] TOOL CARRIER

[75] Inventors: Frank Johnson, Cambridge; Donald Gordon, Rockwood, both of Canada; George Schick, Easton, Conn.

[73] Assignee: Slater Steel Industries, Limited, Ontario, Canada

[21] Appl. No.: 110,768

[22] Filed: Jan. 9, 1980

[51] Int. Cl.³ .................................................. B62B 1/02
[52] U.S. Cl. ................................ 280/47.26; 280/47.19
[58] Field of Search ............... 280/47.17, 47.19, 47.24, 280/47.26, 47.33, 47.34, 47.35, 79.1 A, 79.2; 206/349; 312/DIG. 33; D12/32–34; 248/129

[56] References Cited

U.S. PATENT DOCUMENTS

| | | | |
|---|---|---|---|
| 1,960,862 | 5/1934 | Baldwin | 280/47.19 |
| 2,579,639 | 12/1951 | Adams | 280/47.19 X |

FOREIGN PATENT DOCUMENTS

| | | | |
|---|---|---|---|
| 1194958 | 11/1959 | France | 280/47.35 |
| 461770 | 2/1937 | United Kingdom | 280/47.24 |

*Primary Examiner*—Joseph F. Peters, Jr.
*Assistant Examiner*—Donald W. Underwood
*Attorney, Agent, or Firm*—Burgess, Ryan & Wayne

[57] ABSTRACT

A tool carrier having a first tool receptacle or container and a second tool receptacle mounted on a frame which is made up of a pair of essentially reverse Z-shaped side members joined at the top by a transverse handle and having at the bottom a short vertical leg, the legs being joined by a transverse member. The upper arm of the "Z" is essentially horizontal and the lower arm of the "Z" is slanted downwardly and forwardly to form the leg. At the upper and rearward end of the lower arm of the "Z" an axle passes through both side members and a wheel is mounted at each end of the axle. The first receptacle rests on the cross member and the axle. The second receptacle comprises a number of pockets and depends from the handle. Means for holding the handles of long-handled tools are provided on the upper arm of the "Z".

4 Claims, 6 Drawing Figures

TOOL CARRIER

BACKGROUND OF THE INVENTION

The present invention relates to tool carriers, and more particularly the present invention relates to a portable tool carrier in the form of a hand cart.

While the tool carrier of the present invention is useful for storing and transporting a variety of types of implements, it is particularly useful for storing and transporting garden tools. Garden tools are customarily stored in basements, garages, tool sheds, or the like and manually carried to the particular location where they will be used. While these implements are often stored in a systematic manner, they are equally often merely placed in a corner leaning against a wall, or thrown helter-skelter in some inaccessible location along with other tools. When they are needed for use in a garden, the user frequently cannot find the particular tool which he wants, or must make several trips carrying the various tools which he needs since these tools are usually clumsy and difficult to carry. Such tools include shovels, rakes, hoses, pitch forks, spades, and the like, as well as smaller hand tools such as shears, trowels, and other miscellaneous small tools. Frequently, chemicals or fertilizers, sprayers, twine, or other materials are needed and these must also be found and carried to their location of use.

There are on the market a number of small hand carriers which are suitable for carrying small hand tools, but are themselves often clumsy to handle, especially when large tools are also being carried. In co-pending application Ser. No. 12,223, filed Feb. 15, 1979, which is commonly assigned herewith, a hand cart is described which might be used to transport large tools, but it is not designed for such use and would be awkward for such use.

SUMMARY OF THE INVENTION

It is, therefore, the primary object of the present invention to provide a tool carrier which is free of the aforementioned and other such disadvantages.

It is another object of the present invention to provide a tool carrier which is suitable for storing and transporting tools, both large and small, as well as other implements for use in a location remote from where they are normally stored.

It is yet another object of the present invention to provide a tool carrier, consistent with the foregoing objects, which is simple in construction and earily assembled.

Consistent with these objects, the present invention concerns a tool carrier which is light in weight and sturdy in construction, basically comprising a tubular metal frame mounted on wheels, a lower plastic tool receptacle, upper tool handle gripping means, and a number of smaller pockets for receiving small tools and other objects. The frame comprises a pair of identical side members which are essentially reverse Z-shaped and joined at the top by a transverse handle. The upper arm of the "Z" is essentially horizontal while the lower arm of the "Z" is slanted downwardly and forwardly. The front lower end of the lower arm of the "Z" turns upwardly to form a vertical leg and the vertical legs of the two sides are joined by a transverse member. A transverse axle passes through the rear end of the lower arm of the "Z" and a wheel is attached to each end of the axle.

A plastic receptacle, or container, is mounted on the bottom of the frame, with the front portion of the receptacle supported at a lip thereof by the transverse member. The rear portion of the receptacle rests on the axle. Handle gripping means are mounted on the upper arms of the Z-shaped side members of the frame. A transverse partition is provided in the receptacle, the partition being held in the receptacle by tabs and slots, and forming a relatively small forward compartment and a relatively large rear compartment. Another receptacle member is vertically mounted between the handle and the lower receptacle and contains a number of pockets for holding small implements. Means are mounted on the upper arms of the Z-shaped side members of the frame to grip the handles of long-handled tools.

BRIEF DESCRIPTION OF THE DRAWINGS

Other objects and advantages of the present invention will in part be described and in part become apparent when consideration is given to the following detailed description taken in conjunction with the annexed drawings wherein.

DETAILED DESCRIPTION OF THE PREFERRED EMBODIMENT

Figure 1:
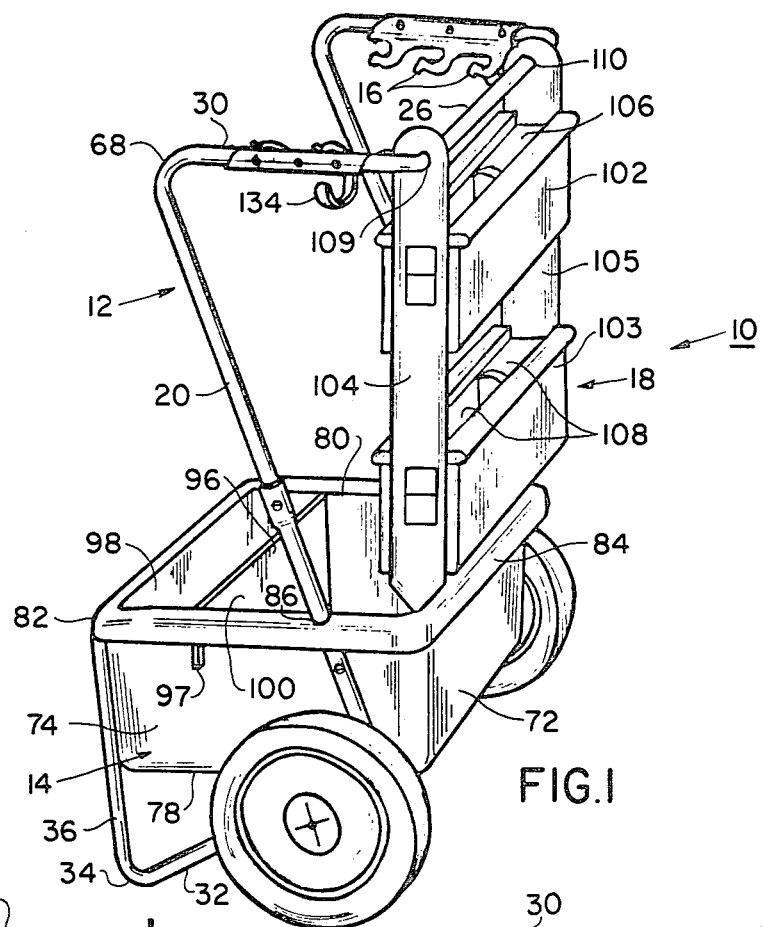
FIG. 1 is a perspective view of a tool carrier according to the present invention.
Figure 2:
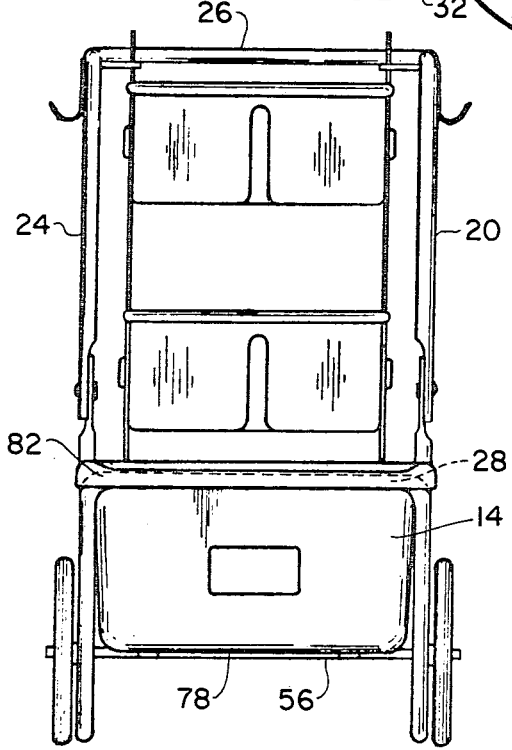
FIG. 2 is a front elevational view of said carrier.
Figure 3:
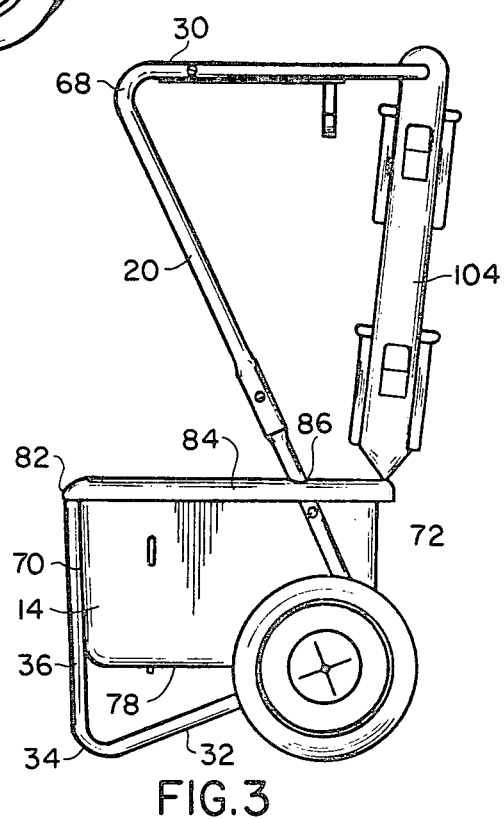
FIG. 3 is a left side elevational view of said carrier.
Figure 4:
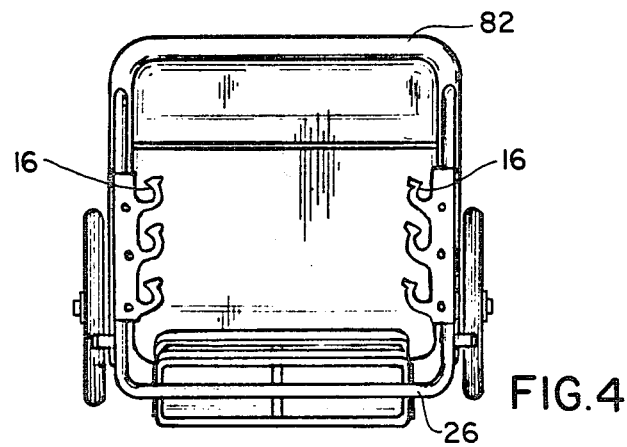
FIG. 4 is a top plan view of said carrier.
Figure 5:
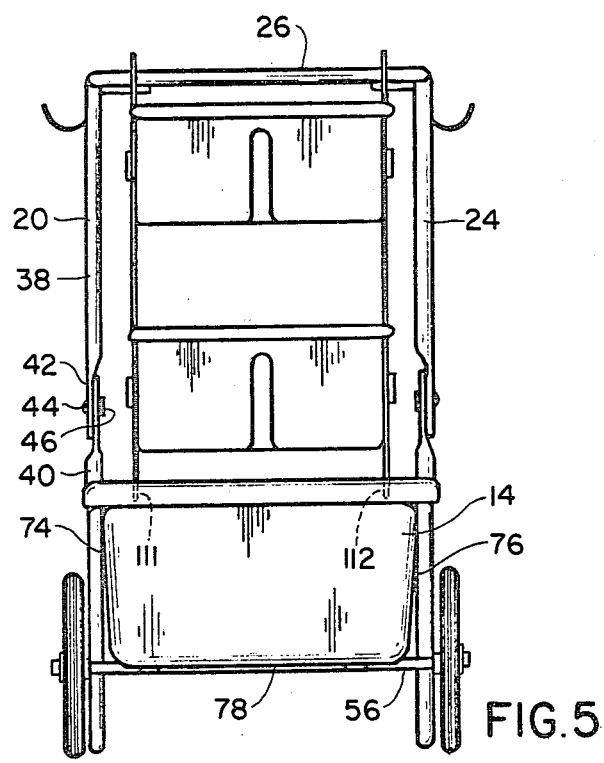
FIG. 5 is a rear elevational view of said carrier.
Figure 6:
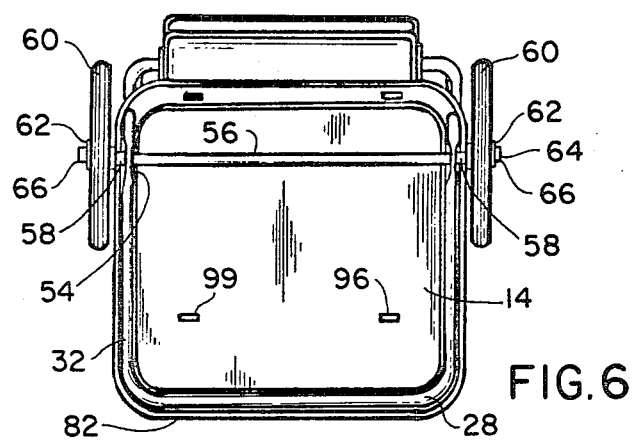
FIG. 6 is a bottom plan view of said carrier.

In the drawings, the tool carrier of the present invention is generally designated by the numeral 10 and comprises a frame generally designated 12, a lower tool receptacle or container generally designated 14, tool handle gripping means 16, and a second tool receptacle generally designated 18. Frame 12 generally comprises a pair of identical opposed reverse (when viewed as in FIG. 3) Z-shaped side members 20 and 24, upper transverse handle 26 and lower transverse member 28. Since side members 20 and 24 are identical, they will be described herein with reference to side member 20, it being distinctly understood that the same description applies to side member 24.

Side member 20 is generally Z-shaped, the upper arm 30 of the "Z" being essentially horizontal, and the lower arm 32 of the "Z" being inclined downwardly and forwardly. Lower arm 32, at its forward and lowermost end terminates at elbow 34 which provides a ground supporting surface and then becomes upwardly directed leg 36. The legs 36 on each side are joined by transverse member 28. The upper arms 30 at each side are joined by transverse handle 26. Thus, it will be appreciated that frame 20 could be constructed of a single tubular metal piece, or, for ease in shipping and assembly, be fabricated of two parts, an upper part and a lower part. The upper part includes handle 26, upper arm 30 of each side, and upper portion 38 of each side member. The lower part would include transverse member 28, legs 36, lower arm 32, and a lower portion 40 of each side member. The joint where upper portion 38 and lower portion 40 are joined could be a socket arrangement 42 locked together with a screw and nuts 44 and 46 or any other suitable arrangement known in the art.

The upper, rearward, portion of arm 32 is flattened in a known manner as shown at 54 and suitable holes provided therein for mounting of axle 56. Axle 56 passes through both lower arms 32 and is locked in place by bushings 58. Wheels 60 are mounted on the ends of axle 56 and are locked in place by washers 62. The complete wheel mounting assembly is further locked by hub caps 64. It will be appreciated by one skilled in the art that the wheel mounting assembly is conventional. Bushings 58 and washers 62 are made of any suitable material which can be press fit on the axle and provide a bearing surface for the sides of the wheel hub 66. An exemplary such material is nylon. The inner bore of bushings 58 and washers 62 is chosen to provide a tight press fit on axle 56. Hub caps 64 are of a conventional cup-like construction with inwardly directed spring teeth which grip the ends of axle 56 when press applied.

It will be recognized that the dimensions of the various elements, as well as the size of wheels 60, are chosen such that elbow 34 is a ground engaging member when the bottom of wheels 60 is touching the ground and the tool carrier is at rest. It will also be appreciated that for stability and ease of use, legs 36, cross-member 28, and elbow 68 are approximately in the same vertical plane.

Lower receptacle or tray 14 is made of a material, and in a manner, well-known in the art. Typically, tray 14 is a molded polyethylene tray and comprises front and rear walls 70 and 72, side walls 74 and 76, bottom 78, and an open top 80. Front lip 82 seats on cross-member 28. A shallow groove (not shown) is molded in the rearward portion of bottom 78 to rest on axle 56. The depth of the groove is of a sufficient depth that bottom 78 is horizontal when the carrier is at rest. The upper edge of front and rear walls 70 and 72, and side walls 74 and 76, extends outwardly and downwardly to form lip 84 (including front lip 82). A hole 86 is provided at each side in lip 84 for portion 40 of frame 12 to pass through. Partition 96 is locked in tray 14 by means of side tabs 97 and bottom tabs 99 which fit in corresponding slots to thereby divide tray 14 into a smaller forward compartment 98 and a rearward larger compartment 100. Forward compartment 98 is useful for storing small hand tools and other miscellaneous items and rear compartment 100 provides storage space for large items such as bags of fertilizer, and large tools which stand upright in the same with their handles extending upwardly and locked in place by tool handle holder 16 which could comprise any clamping arrangement known in the art, but is preferably a hook shaped member.

Rear receptacle carrier 18 is also made of any suitable material such as polyethylene. It comprises trays 102 and 103 supported between uprights 104 and 105 containing a plurality of upper pockets 106 and lower pockets 108.

The upper parts of uprights 104 and 105 have holes 109 and 110 through which handle 26 extends. The lower parts of these uprights have tabs 111 and 112 which extend into corresponding slots in the lip 84 of lower receptacle 14.

Another feature of the tool carrier is hook 134 which is secured at its upper end to arm 30 of frame 12. This hook 134 is useful for storing an extension electrical cord, a hose, or the like.

While reference has been made in this description to screws and nuts as the various fastening means, one skilled in the art will recognize that washers, lock washers, and the like, normally used in such assemblies, would also be used. It will also be appreciated by those skilled in the art that the various fasteners have been described as screws and nuts in terms of the preferred embodiment of the tool carrier which is shipped in a disassembled condition and assembled by the user with ordinary hand tools. Other equivalent fasteners can be used where considerations of ease in assembly using ordinary hand tools are not important. In some instances, such fasteners would be rivets and other instances, such as the assembly of receptacle 18, snap fasteners could be used. In any event, the choice of the type of fastener to be used would be quite apparent to those skilled in the art. Similarly, the materials used for the various elements would be apparent to those skilled in the art. Receptacles 14 and 18 have been described as being made of polyethylene as the preferred material, although any other suitable plastic material could be used. Similarly, frame 12 is preferably made of steel tubing, but any other suitable material know in the art could be used.

It will be appreciated that the objects set forth at the outset have been successfully achieved by reference to presently preferred embodiments which are described for exemplary purposes only. The scope of the invention is limited only by the appended claims.

What is claimed is:

1. A tool carrier comprising an essentially unitary tubular frame, a first tool receptacle, tool handle gripping means, and a second tool receptacle; said frame comprising a pair of identical opposed substantially reverse Z-shaped side members, each side member comprising an upper horizontal portion, an elongated intermediate portion extending downwardly and rearwardly, a lower portion extending downwardly and forwardly, and a vertical upwardly extending front leg, a front transverse member joining the upper ends of said front legs, and a transverse handle joining the rear ends of said upper horizontal portions; a transverse axle extending through the rear end portion of said lower portions; a wheel at each end of said axle, said wheels, lower portions, and legs being so dimensioned that the portion of said frame joining said lower portions and said legs forms a ground engaging member; said first tool receptacle comprising an upwardly open container having a bottom, four side walls, an overhanging upper lip about the upper periphery thereof, and a partition in the forward portion of said receptacle, said front transverse member engaging the forward portion of said overhanging lip of said first tool receptacle to support the front portion of said receptacle, the rearward portion of said receptacle bottom resting on said axle; said tool handle gripping means being affixed to said upper portions; and said second tool receptacle comprising support means substantially vertically disposed between said handle and said container and having a plurality of tool-receiving pockets thereon.

2. A tool carrier as defined in claim 1, wherein the width of said first tool receptacle is substantially equal to the length of said axle between said wheels and a pair of holes are provided in said lip for said intermediate portion of said frame, on either side, to pass therethrough.

3. A tool carrier as defined in claim 1, wherein said handle, upper horizontal portions, and an upper portion of said intermediate portion are fabricated as a single unitary member, said front transverse member, front legs, lower portion, and a lower portion of said intermediate portion are fabricated as a single unitary member, said unitary members terminating in free ends, the free ends of one of said unitary members being adapted to mate, and cooperate, with the free ends of the other of said unitary members.

4. A tool carrier as defined in claim 1, wherein said support means comprises a pair of uprights, the upper part of each upright having a hole through which said transverse handle passes, the lower portion of each upright engaging the lip of said first tool receptacle and further comprising at least one tray comprising said tool receiving pockets and extending between and supported by said uprights.

* * * * *